US012730594B2

(12) United States Patent
Soeda et al.

(10) Patent No.: US 12,730,594 B2
(45) Date of Patent: Sep. 8, 2026

(54) METHOD OF SENDING PRINT DATA

(71) Applicant: CANON KABUSHIKI KAISHA, Tokyo (JP)

(72) Inventors: Yasuhiro Soeda, Kanagawa (JP); Yosuke Miura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 18/734,170

(22) Filed: Jun. 5, 2024

(65) Prior Publication Data

US 2024/0419374 A1 Dec. 19, 2024

(30) Foreign Application Priority Data

Jun. 16, 2023 (JP) ................................ 2023-099177

(51) Int. Cl.
*G06F 3/12* (2006.01)

(52) U.S. Cl.
CPC .......... *G06F 3/1218* (2013.01); *G06F 3/1237* (2013.01)

(58) Field of Classification Search
CPC ............................ G06F 3/1218; G06F 3/1237
USPC ................................................ 358/1.1–1.18
See application file for complete search history.

(56) References Cited

U.S. PATENT DOCUMENTS 6,130,885 A * 10/2000 Izumi ..................... H04B 1/715 370/493
6,798,534 B1 * 9/2004 Nishigaki ................ H04N 1/41 358/1.9
2007/0121144 A1 * 5/2007 Kato ..................... G06F 3/1234 358/1.14
2013/0128317 A1 * 5/2013 Chapman ................ H04N 1/54 358/2.1

FOREIGN PATENT DOCUMENTS

JP H05-347649 A 12/1993
JP 4329238 B2 * 9/2009 .......... H04N 19/265

* cited by examiner

*Primary Examiner* — Gabriel I Garcia
(74) *Attorney, Agent, or Firm* — VENABLE LLP

(57) ABSTRACT

One embodiment of the present invention provides a method of sending print data, including: generating a first data part with a fixed data length; generating a second data part with a variable data length; and combining the first and second data parts in a predetermined order and sending the resulting print data. The first data part includes multiple information pieces. The second data part is capable of including multiple additional information pieces. A first information piece included in the first data part indicates presence or absence of each additional information piece in the second data part. The second information piece includes multiple pieces of synthesized data. In the sending, the multiple pieces of synthesized data are each subjected to bit division, and portions of the pieces of synthesized data subjected to the bit division which have a smaller bit length are continuously arranged in a single packet.

11 Claims, 18 Drawing Sheets

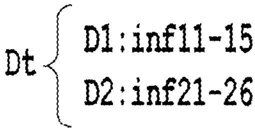
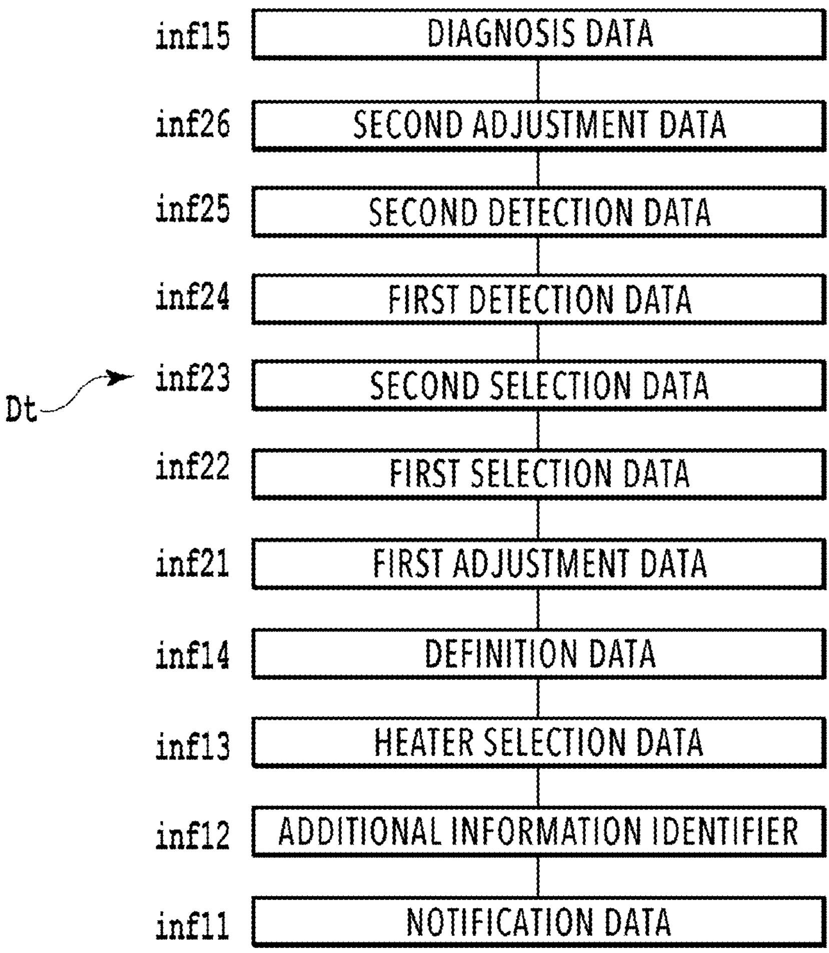
FIG.5 inf12

| | |
|---|---|
| FIRST BIT | PRESENCE OR ABSENCE OF ADDITIONAL INFORMATION PIECE inf21 |
| SECOND BIT | PRESENCE OR ABSENCE OF ADDITIONAL INFORMATION PIECE inf22 |
| THIRD BIT | PRESENCE OR ABSENCE OF ADDITIONAL INFORMATION PIECE inf23 |
| FOURTH BIT | PRESENCE OR ABSENCE OF ADDITIONAL INFORMATION PIECE inf24 |
| FIFTH BIT | PRESENCE OR ABSENCE OF ADDITIONAL INFORMATION PIECE inf25 |
| SIXTH BIT | PRESENCE OR ABSENCE OF ADDITIONAL INFORMATION PIECE inf26 |
| SEVENTH BIT | DUMMY DATA |
| EIGHTH BIT | DUMMY DATA |

FIG.6 inf13
sel(1) sel(2) ••• sel(k)

inf14
d(1) d(2) d(3) d(4) p1(9) p2(9) p3(9) p4(9)
p1(1) p1(2) p1(3) p1(4) p1(5) p1(6) p1(7) p1(8)
p2(1) p2(2) p2(3) p2(4) p2(5) p2(6) p2(7) p2(8)
p3(1) p3(2) p3(3) p3(4) p3(5) p3(6) p3(7) p3(8)
p4(1) p4(2) p4(3) p4(4) p4(5) p4(6) p4(7) p4(8)

inf14
d(1) d(2) d(3) d(4) d(5) d(6) d(7) p1(9)
p1(1) p1(2) p1(3) p1(4) p1(5) p1(6) p1(7) p1(8)
d(8) d(9) d(10) d(11) d(12) d(13) d(14) p2(9)
p2(1) p2(2) p2(3) p2(4) p2(5) p2(6) p2(7) p2(8)
d(15) d(16) d(17) d(18) d(19) d(20) d(21) p3(9)
p3(1) p3(2) p3(3) p3(4) p3(5) p3(6) p3(7) p3(8)
d(22) d(23) d(24) d(25) d(26) d(27) d(28) p4(9)
p4(1) p4(2) p4(3) p4(4) p4(5) p4(6) p4(7) p4(8)

inf14
d(1) d(2) d(3) d(4) d(5) d(6) d(7) p1(9)
p1(1) p1(2) p1(3) p1(4) p1(5) p1(6) p1(7) p1(8)
d(8) d(9) d(10) d(12) d(13) d(14) d(15) p2(9)
p2(1) p2(2) p2(3) p2(4) p2(5) p2(6) p2(7) p2(8)
d(16) d(17) d(18) d(19) d(20) d(21) d(22) p3(9)
p3(1) p3(2) p3(3) p3(4) p3(5) p3(6) p3(7) p3(8)
d(23) d(24) d(25) d(26) d(27) d(28) d(29) p4(9)
p4(1) p4(2) p4(3) p4(4) p4(5) p4(6) p4(7) p4(8)

inf12

| FIRST BIT | PRESENCE OR ABSENCE OF ADDITIONAL INFORMATION PIECE inf21 |
|---|---|
| SECOND BIT | PRESENCE OR ABSENCE OF ADDITIONAL INFORMATION PIECE inf22 |
| THIRD BIT | PRESENCE OR ABSENCE OF ADDITIONAL INFORMATION PIECE inf23 |
| FOURTH BIT | PRESENCE OR ABSENCE OF ADDITIONAL INFORMATION PIECE inf24 |
| FIFTH BIT | PRESENCE OR ABSENCE OF ADDITIONAL INFORMATION PIECE inf25 |
| SIXTH BIT | PRESENCE OR ABSENCE OF ADDITIONAL INFORMATION PIECE inf26 |
| SEVENTH BIT | PRESENCE OR ABSENCE OF ADDITIONAL INFORMATION PIECE inf27 |
| EIGHTH BIT | DUMMY DATA |

FIG.14

| | | | | | | | | |
|---|---|---|---|---|---|---|---|---|
| inf27 | d(1) | d(2) | d(3) | d(4) | p1(9) | p2(9) | p3(9) | p4(9) |
| inf14 | p1(1) | p1(2) | p1(3) | p1(4) | p1(5) | p1(6) | p1(7) | p1(8) |
| | p2(1) | p2(2) | p2(3) | p2(4) | p2(5) | p2(6) | p2(7) | p2(8) |
| | p3(1) | p3(2) | p3(3) | p3(4) | p3(5) | p3(6) | p3(7) | p3(8) |
| | p4(1) | p4(2) | p4(3) | p4(4) | p4(5) | p4(6) | p4(7) | p4(8) |

FIG.15A

| | | | | | | | | |
|---|---|---|---|---|---|---|---|---|
| inf14 | p1(1) | p1(2) | p1(3) | p1(4) | p1(5) | p1(6) | p1(7) | p1(8) |
| | p2(1) | p2(2) | p2(3) | p2(4) | p2(5) | p2(6) | p2(7) | p2(8) |
| | p3(1) | p3(2) | p3(3) | p3(4) | p3(5) | p3(6) | p3(7) | p3(8) |
| | p4(1) | p4(2) | p4(3) | p4(4) | p4(5) | p4(6) | p4(7) | p4(8) |

FIG.15B

| d(1) | d(2) | d(3) | d(4) | p1(1) | p2(1) | p3(1) | p4(1) |
|---|---|---|---|---|---|---|---|
| p1(2) | p1(3) | p1(4) | p1(5) | p1(6) | p1(7) | p1(8) | p1(9) |
| p2(2) | p2(3) | p2(4) | p2(5) | p2(6) | p2(7) | p2(8) | p2(9) |
| p3(2) | p3(3) | p3(4) | p3(5) | p3(6) | p3(7) | p3(8) | p3(9) |
| p4(2) | p4(3) | p4(4) | p4(5) | p4(6) | p4(7) | p4(8) | p4(9) |

inf27 (first row); inf14 (rows 2–5)

FIG.17A

| p1(2) | p1(3) | p1(4) | p1(5) | p1(6) | p1(7) | p1(8) | p1(9) |
|---|---|---|---|---|---|---|---|
| p2(2) | p2(3) | p2(4) | p2(5) | p2(6) | p2(7) | p2(8) | p2(9) |
| p3(2) | p3(3) | p3(4) | p3(5) | p3(6) | p3(7) | p3(8) | p3(9) |
| p4(2) | p4(3) | p4(4) | p4(5) | p4(6) | p4(7) | p4(8) | p4(9) |

inf14

FIG.17B

METHOD OF SENDING PRINT DATA

BACKGROUND

Field

The present disclosure relates to a technique for sending print data.

Description of the Related Art

Printing apparatuses have print heads in which multiple nozzles for ejecting liquids such as inks are arrayed. For example, in a case where a print job is input into such a printing apparatus from an external apparatus (such as a personal computer), print data based on this print job is sent to the print head. The print head ejects the liquids based on the sent print data. This print data is sent in a predetermined unit and is called "packets" or the like.

Japanese Patent Laid-Open No. H5-347649 discloses that, in a case of serially sending data, the data to be sent is given information for identifying the data length of this data to make the size of each unit pieces of data to be sent variable.

SUMMARY

Printing apparatuses in recent years have a larger variety of functions than conventional ones. Accordingly, the volume of print data to be sent tends to be large, and there is a demand to quickly send such print data. However, it is hard to say that print data can be efficiently sent in those printing apparatus with the technique of Japanese Patent Laid-Open No. H5-347649. Thus, there is a demand for a further improvement for sending of print data.

In view of the above, an object of the present disclosure is to efficiently send print data in a printing apparatus having a variety of functions.

One embodiment of the present invention provides a method of sending print data in a printing apparatus by a serial transfer method, including: generating a first data part with a fixed data length; generating a second data part with a variable data length; and combining the first data part and the second data part in a predetermined order and sending the resulting print data, in which the first data part includes a plurality of information pieces, the second data part is capable of including a plurality of additional information pieces, a first information piece being one of the plurality of information pieces included in the first data part indicates presence or absence of each of the plurality of additional information pieces in the second data part, a second information piece being one of the plurality of information pieces includes a plurality of pieces of synthesized data, and in the sending, the plurality of pieces of synthesized data are each subjected to bit division, and portions of the pieces of synthesized data subjected to the bit division which have a smaller bit length are continuously arranged in a single packet.

Further features of the present invention will become apparent from the following description of exemplary embodiments with reference to the attached drawings.

BRIEF DESCRIPTION OF THE DRAWINGS

FIG. 5 is a diagram illustrating a data structure of print data Dt to be sent in a single operation;

FIG. 6 is a diagram illustrating the content of an additional information identifier;

FIGS. 11A and 11B are timing charts for explaining operations of driving elements and the like;

FIG. 14 is a diagram illustrating contents of an additional information identifier;

FIGS. 15A and 15B are diagrams illustrating bit arrays of information pieces inf;

FIGS. 17A and 17B are diagrams illustrating bit arrays of information pieces inf.

DESCRIPTION OF THE EMBODIMENTS

Figure 1A:
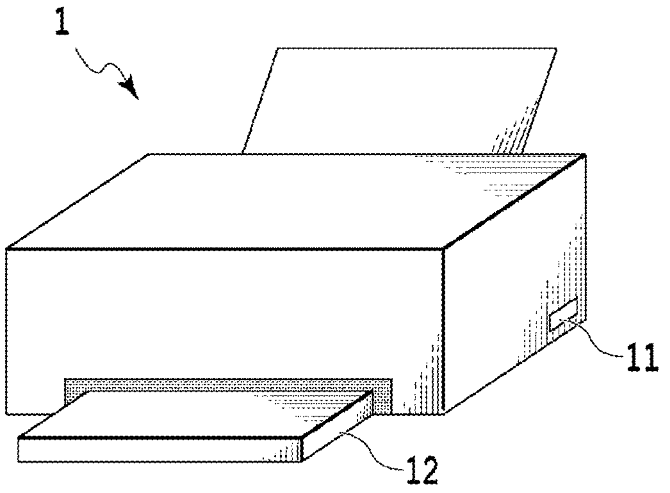
FIGS. 1A and 1B are diagrams illustrating a configuration of a printing apparatus.

Embodiments of the present disclosure will be specifically described below with reference to the accompanying drawings. It is to be noted that the following embodiments are not intended to limit the invention according to the claims more than necessary. Moreover, although multiple features are described in the following embodiments, not all of these multiple features are necessarily essential to the present disclosure's solution to the problem. These multiple features may be combined as desired. Furthermore, in the accompanying drawings, identical or similar components are denoted by the same reference numeral, and overlapping description may be omitted.

First Embodiment

Figure 1B:
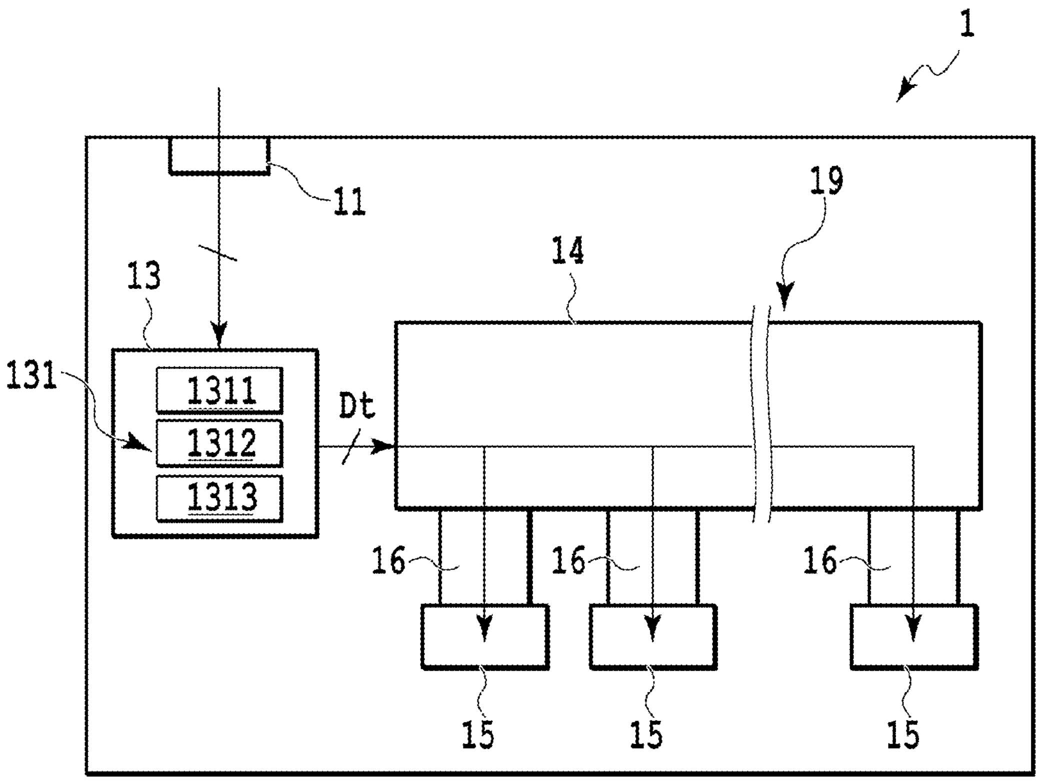

FIGS. 1A and 1B are diagrams illustrating a configuration of a printing apparatus in a first embodiment. Specifically, FIG. 1A is a schematic perspective view illustrating outer appearance of the printing apparatus, and FIG. 1B is a block diagram illustrating a configuration of a circuit block inside the printing apparatus.

As illustrated in FIG. 1A, a printing apparatus 1 has a connector 11 and a discharge tray 12. The printing apparatus 1 is connected to an external information processing apparatus (not illustrated), such as a personal computer, via wired communication through the connector 11 (or via wireless communication). The external information processing apparatus may be expressed as a host apparatus or the like. One or more sheets are loaded on the printing apparatus 1. Based on a print job received from the external information processing apparatus, the printing apparatus 1 performs printing on a sheet, and discharges the printed sheet onto the discharge tray 12.

The printing apparatus 1 is configured to capable of performing printing on a sheet by an ink jet method, and further has a conveyance mechanism not illustrated which conveys a sheet and a later-described print head 19 (see FIGS. 1B and 12) which performs printing on the conveyed sheet. While publicly known heads such as a line head and a serial head can be employed as the print head 19, a line head is employed in the present embodiment.

FIG. 1B is a block diagram illustrating a configuration of a circuit block inside the printing apparatus. The operation timing with which this circuit block operates is set with later-described pieces of synthesized data p1 to p4. The setting of the operation timing with the pieces of synthesized data will be specifically described later (see FIGS. 10, etc.).

As illustrated in FIG. 1B, the printing apparatus 1 has a control circuit board 13, a head substrate 14, and multiple element substrates 15. The control circuit board 13 is provided in the main body of the printing apparatus, and the head substrate 14 and the element substrates 15 are provided in the print head 19. The control circuit board 13 generates later-described print data Dt based on a print job input through the connector 11, and outputs the generated print data Dt to the head substrate 14 (see FIG. 2). A single flexible circuit board 16 is connected to each of the multiple element substrates 15. Each of the multiple element substrates 15 is electrically and communicatively connected to the head substrate 14 through the corresponding flexible circuit board 16. This configuration enables the head substrate 14 to send each of the multiple element substrates 15 the corresponding print data Dt through the corresponding flexible circuit board 16.

Here, the multiple element substrates 15 are arranged along one direction, and later-described multiple printing elements 201 (see FIG. 4) are arrayed along the one direction in each individual element substrate 15. Multiple nozzles for ejecting droplets of liquids, such as inks, are arrayed in the print head 19, and the printing elements 201 are provided respectively for these nozzles. Ink droplets are ejected from the nozzles by driving the printing elements 201. Publicly known elements may be used as the printing elements 201. In the present embodiment, electrothermal conversion elements (which are called "heater elements" or "resistive elements") are used but piezoelectric elements may be used instead of the electrothermal conversion elements.

The control circuit board 13 has a processor 131 that performs calculation processing for implementing functions of the printing apparatus 1. For example, the processor 131 functions as a sending unit that generates the print data Dt and sends the generated print data Dt to the element substrates 15. As will be described later in detail, the processor 131 implements this sending unit by having a first generation unit 1311, a second generation unit 1312, and a third generation unit 1313.

Incidentally, a semiconductor device such as an application-specific integrated circuit (ASIC) or a programmable logic device (PLD) is typically used as the processor 131. Alternatively, in another embodiment, the processor 131 may be configured of a central processing unit (CPU) and a memory. For this reason, each function of the processor 131 may be implemented with hardware or software or with a combination of hardware and software.

The print data Dt is sent in a predetermined unit by a serial transfer method, and a piece of data to be sent in a single operation is called a packet or the like. In the present embodiment, the control circuit board 13 serially generates the print data Dt in units of packets and then serially sends the generated print data Dt to the element substrates 15 through the head substrate 14. Incidentally, a constituent element other than the control circuit board 13 may generate the print data Dt. For example, the head substrate 14 may serially generate the print data Dt in units of packets and then serially send the print data Dt to the element substrates 15.

Figure 2:
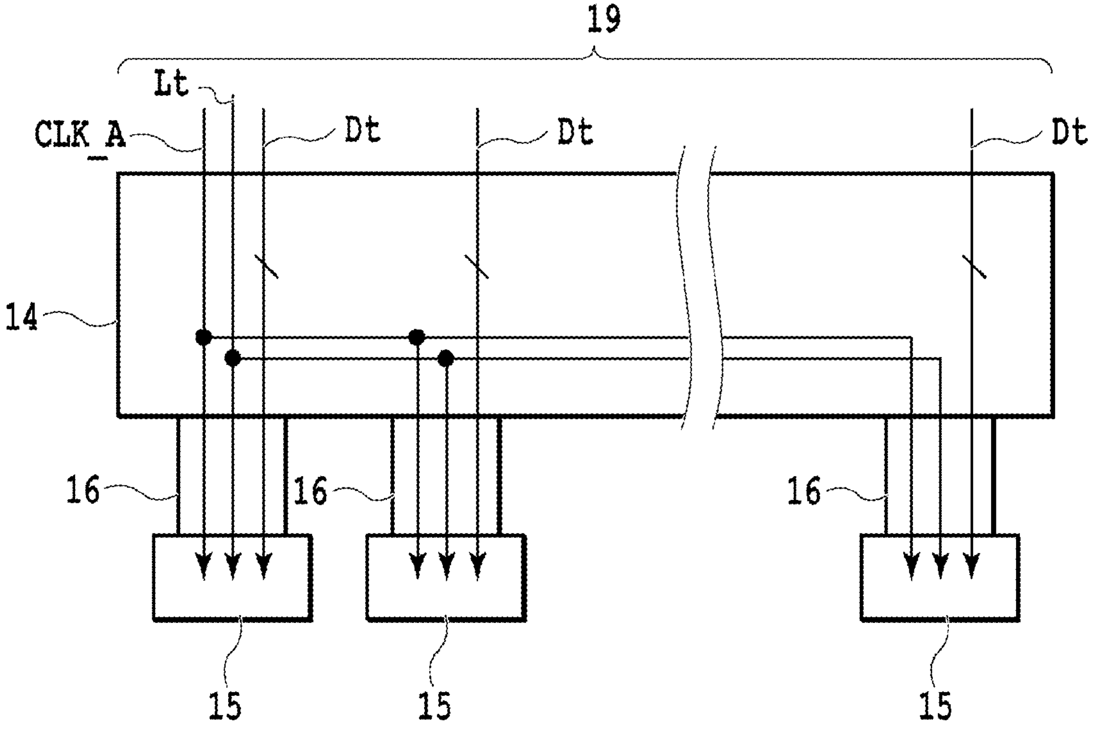
FIG. 2 is a block diagram illustrating a configuration of a print head.

FIG. 2 is a block diagram illustrating a configuration of the print head 19 having the head substrate 14 and the multiple element substrates 15. Each of the multiple element substrates 15 receives the print data Dt as well as a clock signal CLK_A and a latch signal Lt sent from the control circuit board 13 through the flexible circuit board 16. The clock signal CLK_A makes it possible for two or more elements to synchronize with one another with at least one of rise edges of the waveform of this signal (shift from a low level to a high level) or fall edges (shift from the high level to the low level). The latch signal Lt makes it possible to latch the individual signals forming the print data Dt at a latch circuit not illustrated with the rise edges or the fall edges of the waveform of this signal.

Figure 3:
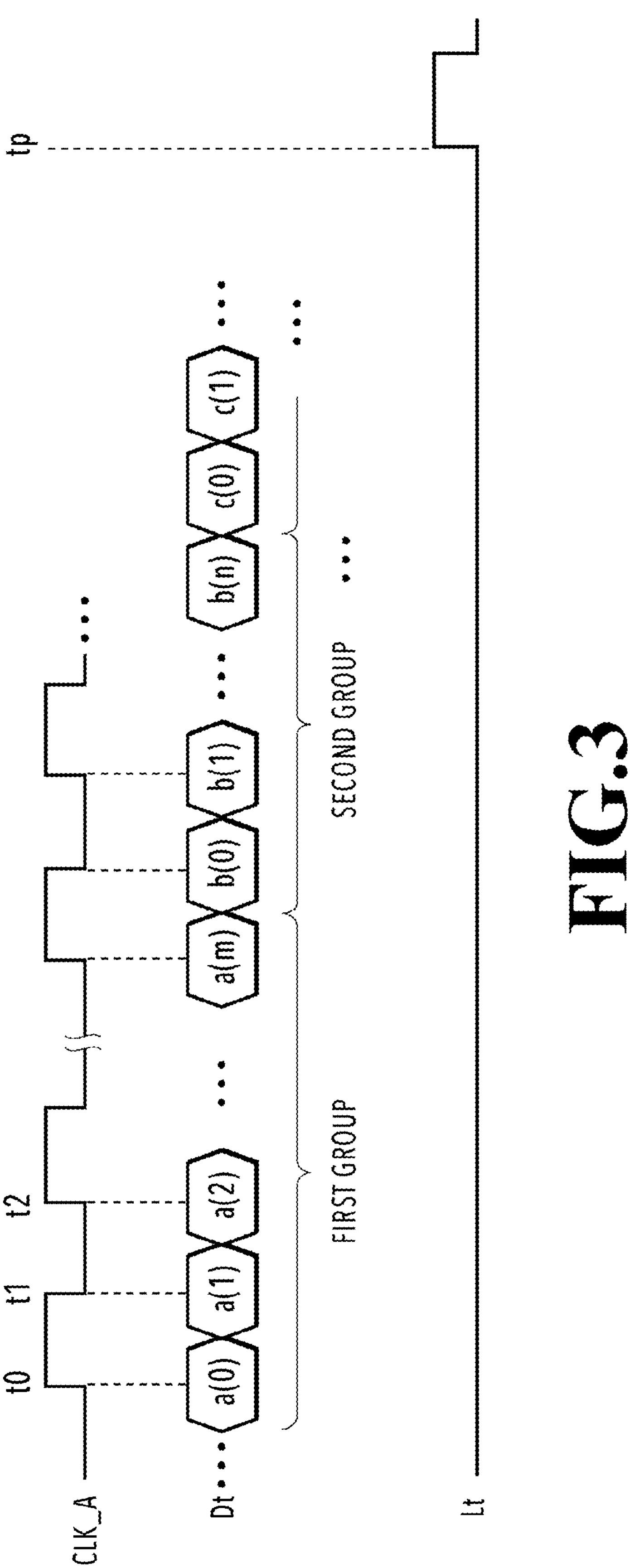
FIG. 3 is a timing chart of data and signals to be input into element substrates.

FIG. 3 is a general timing chart of sending of data, illustrating the print data Dt to be sent in a single operation and the clock signal CLK_A and the latch signal Lt to be input into the element substrates 15 along with this print data. As will be described later in detail, the print data Dt includes multiple information pieces inf11, inf12, and so on (simply referred to as "information piece(s) inf" unless otherwise distinguished from one another), and each individual information piece inf includes multiple signals. For example, the information piece inf11 (the first group in FIG. 3) is m-bit data including signals a(0), a(1), a(2), . . . , a(m), where m and n are integers of 1 or more. The information piece inf12 (the second group in FIG. 3) is n-bit data including signals b(0), b(1), b(2), . . . , b(n). Incidentally, bit data includes multiple signals, and the value of each individual signal can be expressed as "bit value" as well. Note that, considering the configuration of the circuit to receive the data, the number of bits in each group is preferably the same (m=n is preferable in this example).

In the example of FIG. 3, the signal a(0) and so on mentioned above are sequentially input based on the rise edges and fall edges of the clock signal CLK_A at times t0, t1, t2, and so on, and then the signals a(0) and so on thus sent are latched at a time tp at which the latch signal Lt forms a rise edge. Thus, the print data Dt to be sent in a single operation is defined between a fall edge of the latch signal Lt to the next rise edge of the latch signal Lt.

Figure 4:
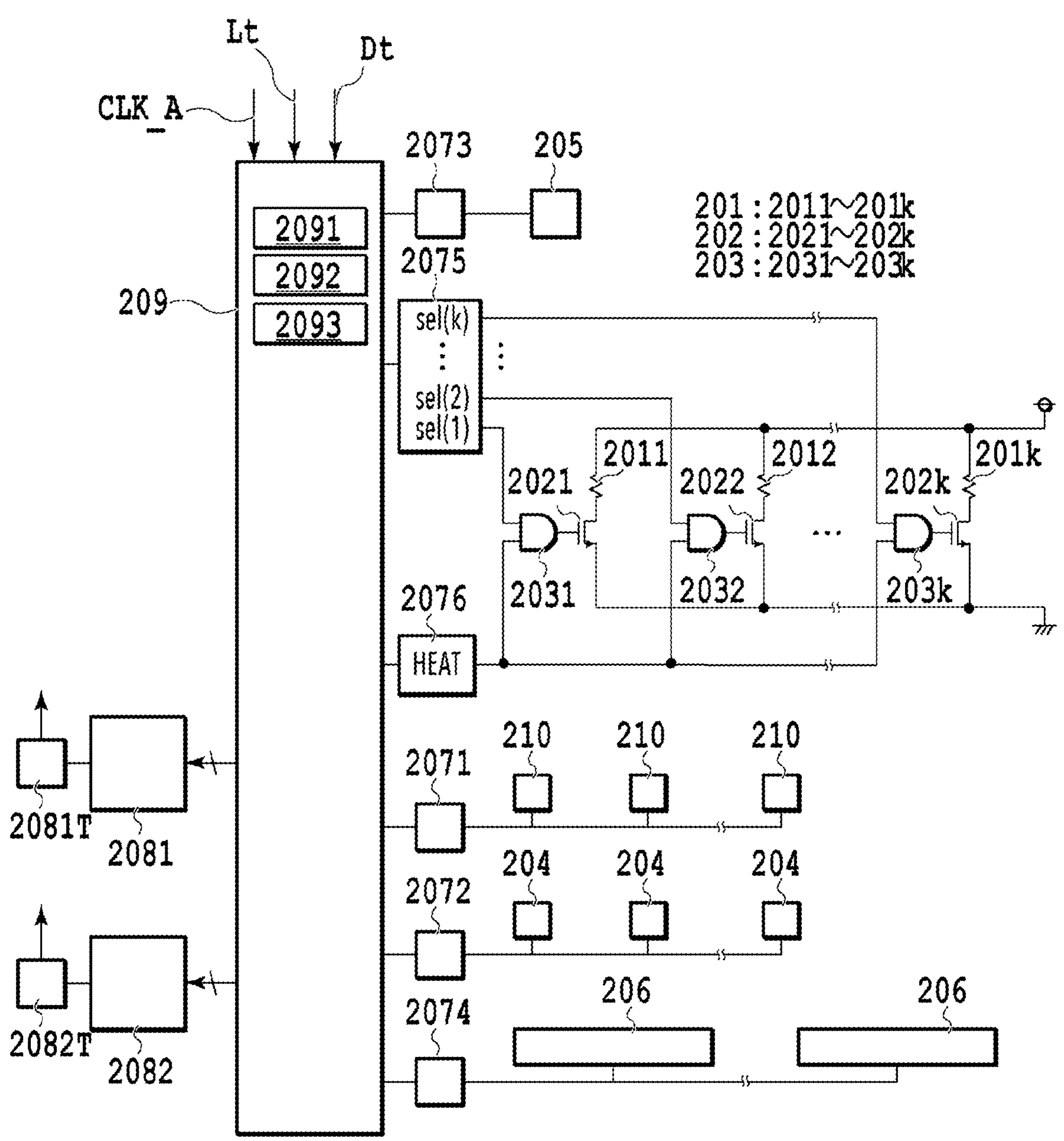
FIG. 4 is a diagram illustrating a configuration of an element substrate.

FIG. 4 illustrates an example configuration of each individual element substrate 15. Each element substrate 15 includes has printing elements 2011 to 201*k*, driving elements 2021 to 202*k*, and logic elements 2031 to 203*k*. Each element substrate 15 further has multiple ejection sensors 210, multiple residue removal units 204, a temperature sensor 205, multiple heating elements 206, logic units 2071 to 2076, signal output units 2081 and 2082, and a processor 209. Incidentally, the printing elements 2011 to 201*k*, the driving elements 2021 to 202*k*, and the logic elements 2031 to 203*k* will be referred to as "printing element(s) 201", "driving element(s) 202", and "logic element(s) 203", respectively, unless otherwise needed to be distinguished from one another. It is to be noted that such a rule of representation will be applied similarly to other constituent elements herein.

The multiple driving elements 202 are each connected in series to a corresponding one of the printing elements 201. As each individual driving element 202, a publicly known switching elements, such as a metal oxide semiconductor (MOS) transistor, is used. The driving element 202 electrifies and drives the printing element 201 by turning into a conducting state, and stops the driving by turning to a non-conducting state. In the case where the driving element 202 is a MOS transistor, the gate terminal is connected to the output of the logic element 203, and the source terminal and the drain terminal are arranged so as to form a current path between the driving element 202 and the printing element 201. As for the inputs of each logic element 203, the logic element 2031, for example, receives a signal sel(1) from the logic unit 2075 and a signal HEAT from the logic unit 2076. This applies also to the other logic elements. The logic element 2032 receives a signal sel(2) from the logic unit 2075 and the signal HEAT from the logic unit 2076, and the logic element 203*k* receives a signal sel(k) from the logic unit 2075 and the signal HEAT from the logic unit 2076.

A single ejection sensor 210 is provided for a single printing element 201. Thus, the number of ejection sensors 210 is equal to the number of printing elements 201. Each individual ejection sensor 210 is capable of detecting whether an ink droplet has been properly ejected as a result of driving the corresponding printing element 201. The logic unit 2071 is capable of controlling the driving of each individual ejection sensor 210 and obtaining the result of the detection by the ejection sensor 210. In this way, the processor 209 can receive the result of the detection by each individual ejection sensor 210 from the logic unit 2071.

A single residue removal unit 204 is provided for a single printing element 201. Thus, the number of residue removal units 204 is equal to the number of printing elements 201. Each individual residue removal unit 204 includes electrodes, for example. The logic unit 2072 is capable of driving each residue removal unit 204 by applying a predetermined voltage to the residue removal unit 204 based on a signal from the processor 209, and thereby removing ink residues that can be present inside ink flow channels near the corresponding printing element 201.

At least one temperature sensor 205 is arranged at a predetermined position on or in each element substrate 15 (e.g., on its peripheral edge portion or the like) and is capable of detecting the temperature of the element substrate 15. The logic unit 2073 is capable of controlling the driving of the temperature sensor 205 and obtaining the result of the detection by the temperature sensor 205. In this way, the processor 209 can receive the result of the detection by the temperature sensor 205 from the logic unit 2073.

The multiple heating elements 206 are arranged at predetermined positions on or in the element substrate 15 (e.g., on its peripheral edge portions). As each individual heating element 206, an electrothermal conversion element is used, like the printing elements 201. The logic unit 2074 drives the heating elements 206 based on a signal from the processor 209 to thereby adjust the temperatures of the element substrates 15. Incidentally, in the present embodiment, electrothermal conversion elements are used as both the printing elements 201 and the heating elements 206, but the heating elements 206 will also be called "sub-heaters" or "sub-heater elements" to be distinguished from the printing elements 201.

The signal output unit 2081 outputs analog signals indicating the results of the detections by the ejection sensors 210 and the temperature sensor 205 and the results of the driving of the residue removal units 204 to the control circuit board 13 through an output terminal 2081T based on a signal from the processor 209. The signal output unit 2082 outputs digital signals indicating the results of the detections by the ejection sensors 210 and the temperature sensor 205 and the results of the driving of the residue removal units 204 to the control circuit board 13 through an output terminal 2082T based on a signal from the processor 209. As the signal output units 2081 and 2082, publicly known multiplexers may be used. The signal output units 2081 and 2082 output one or both of the above analog signals and the digital signals to the control circuit board 13.

The processor 209 controls the driving of each element described above by performing predetermined calculation processing. As will be described later in detail, the processor 209 includes a first processing unit 2091, a second processing unit 2092, and a third processing unit 2093. Like the processor 131, each function of the processor 209 may be implemented with hardware or software.

As described above, the circuit block illustrated in FIG. 1B has the element substrates 15, each element substrate 15 has the whole circuit illustrated in FIG. 4, and the circuit illustrated in FIG. 4 has the processor 209, the logic elements 2031 to 203*k*, and the logic units 2071 to 2076.

FIG. 5 illustrates an example data structure of the print data Dt being data (serial data) to be sent in a single operation. The print data Dt includes a first data part D1 and can additionally include a second data part D2. That is, the first data part D1 is always included in the print data Dt but the second data part D2 can be omitted from the print data Dt as appropriate. The data part D1 includes multiple information pieces inf11 to inf15, and their data length (data size) is fixed. The data part D2 is capable of containing multiple additional information pieces inf21 to inf26, and their data length is variable depending on the presence or absence of each additional information piece.

First, the constituent elements of the data part D1, which is the essential data part, specifically, the information pieces inf11 to inf15 will be described.

The information piece inf11 forms notification data which forms one form of the header of the print data Dt (start condition) and indicates start of communication.

The information piece inf12 indicates the presence or absence of each of the multiple additional information pieces inf21 to inf26, which can be included in the data part D2. As mentioned above, the data length of the data part D2 is variable depending on the presence or absence of the multiple additional information pieces inf21 to inf26, and the data length of the data part D2 can be figured out by using the data of the information piece inf12. Due to such a characteristic of the information piece inf12, the information piece inf12 will be referred to as "additional information identifier", skip flag", or the like.

The information piece inf13 forms data for selecting which heater to drive (heater selection data). Incidentally, as will be described later in detail, the information piece inf13 includes k bits (see FIG. 8A), and the circuit configuration is such that these bits and the printing elements 201 in FIG. 4 are in a one-to-one correspondence, and only the printing elements 201 corresponding to bits to which 1 is written as sel are driven. Also, as will be described later in detail, the data of the information piece inf13 determines the timing of the signal HEAT (see FIG. 10).

The information piece inf14 forms definition data for defining the pulse waveforms and driving timing of driving signals for the printing elements 201. Due to such a characteristic of the information piece inf14, the information piece inf14 will be referred to as "heat pulse definition data".

The information piece inf15 is arranged at the end of the print data Dt and forms diagnosis data for diagnosing whether the print data Dt has been properly sent.

Next, the constituent elements of the data part D2, which is an additional data part, specifically, the additional information pieces inf21 to inf26 will be described.

The additional information piece inf21 forms first adjustment data indicating whether to heat the element substrate 15 with the heating elements 206. As mentioned earlier, the heating elements 206 are referred to also as "sub-heaters" or "sub-heater elements".

The additional information piece inf22 forms first selection data indicating that outputting of the analog signals from the signal output unit 2081 to the control circuit board 13 is to be selected.

The additional information piece inf23 forms second selection data indicating that outputting of the digital signals from the signal output unit 2082 to the control circuit board 13 is to be selected.

The additional information piece inf24 forms first detection data indicating whether to obtain the results of the detection by the ejection sensors 210.

The additional information piece inf25 forms second detection data indicating whether to obtain the result of the detection by the temperature sensor 205.

The additional information piece inf26 forms second adjustment data indicating whether to remove ink residues with the residue removal units 204.

As described above using FIG. 5, the data part D1 contains information that is actually needed to execute printing or information directly related to the printing operation. The data part D2, on the other hand, contains information that is needed at the preparation stage before the execution of the printing or information indirectly related to the printing operation.

FIG. 6 illustrates the content of the information piece inf12, which is an additional information identifier. In the present embodiment, the information piece inf12 is 8-bit data. The first bit indicates the presence or absence of the additional information piece inf21. The second bit indicates the presence or absence of the additional information piece inf22. The third to sixth bits likewise indicate the presence or absence of the corresponding respective additional information pieces inf. The seventh and eighth bits are dummy data (NULL) for making the data size of the information piece inf12 eight bits. In the present embodiment, each individual bit takes a binary value of "0" or "1". Here, "0" indicates presence whereas "1" indicates absence. For example, in a case where the first bit is "0", the data part D2 includes the additional information piece inf21. In a case where the first bit is "1", the data part D2 does not include the additional information piece inf21.

FIGS. 7A to 7D illustrates versions of the print data Dt (data to be sent in a single operation) to be used in four modes (first to fourth modes) for sending print data.

Figures 7A, 7B, 7C, 7D:
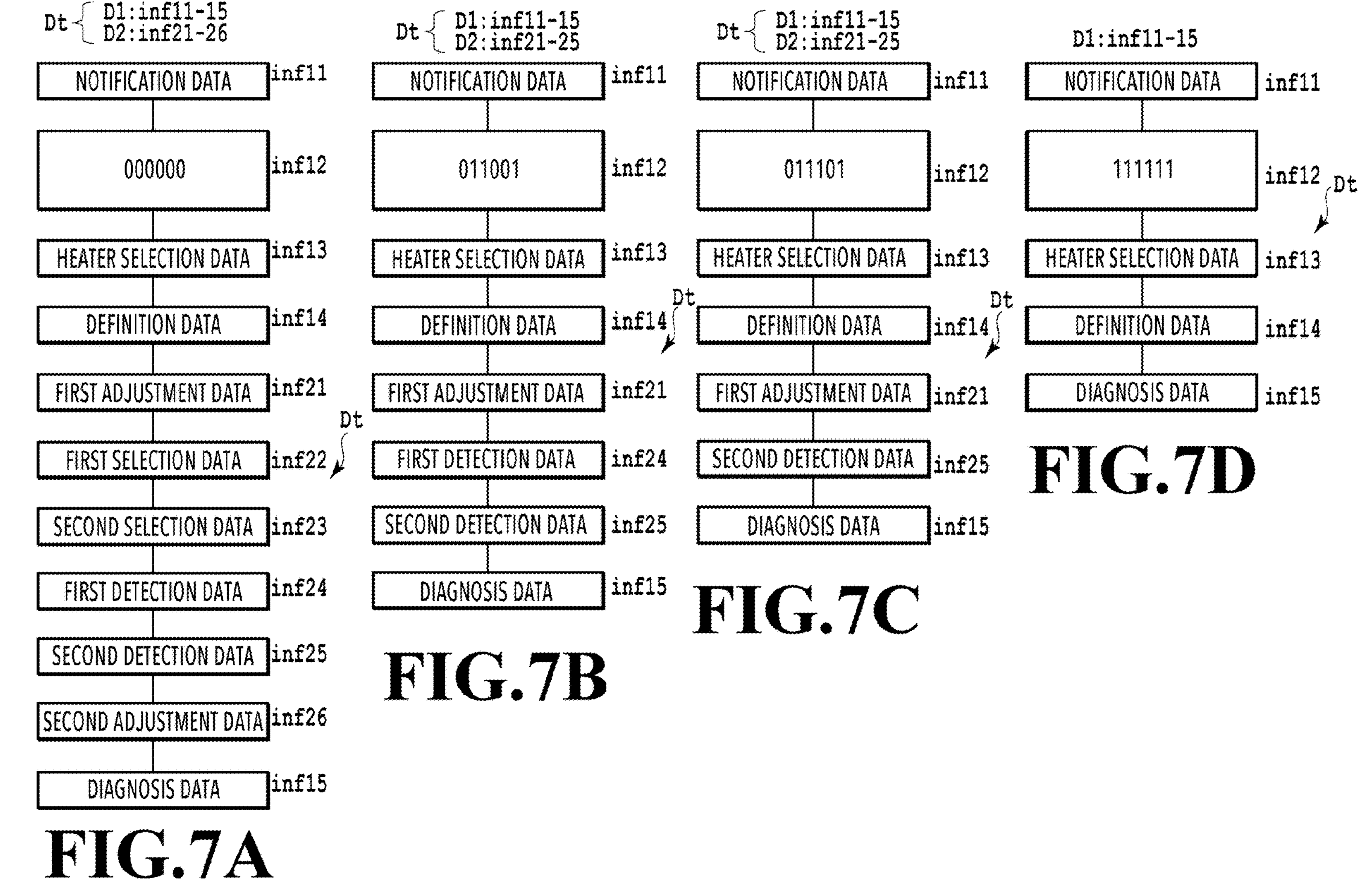
FIGS. 7A to 7D are diagrams illustrating data structures of the print data Dt corresponding to modes.

FIG. 7A illustrates the data structure of the print data Dt in the first mode. The first mode refers to a sending mode in a case where all functions are selected. As illustrated in FIG. 7A, the first to sixth bits in the information piece inf12, which is an additional information identifier, are "000000" (the first, second, . . . , sixth bits in this order from the head). In this case, the print data Dt includes the information pieces inf11 to inf15 as the data part D1 and further includes all of the additional information pieces inf21 to inf26 as the data part D2. Accordingly, the data length of the print data Dt is longest.

FIG. 7B illustrates the data structure of the print data Dt in the second mode. The second mode refers to a sending mode in a case where driving of the sub-heaters, detection by the ejection sensors, detection by the temperature sensor are selected. As illustrated in FIG. 7B, the first to sixth bits in the information piece inf12 are "011001". In this case, the print data Dt includes the information pieces inf11 to inf15 as the data part D1 and further includes the additional information pieces inf21, inf24, and inf25 as the data part D2. The additional information pieces inf22, inf23, and inf26 are omitted.

FIG. 7C illustrates the data structure of the print data Dt in the third mode. The third mode refers to a sending mode in a case where driving of the sub-heaters and detection by the temperature sensor are selected. As illustrated in FIG. 7C, the first to sixth bits in the information piece inf12 are "011101". In this case, the print data Dt includes the information pieces inf11 to inf15 as the data part D1 and further includes the additional information pieces inf21 and inf25 as the data part D2. The additional information pieces inf22, inf23, inf24, and inf26 are omitted.

FIG. 7D illustrates the data structure of the print data Dt in the fourth mode. The fourth mode refers to a sending mode in which only driving of the sub-heaters is selected. As illustrated in FIG. 7D, the first to sixth bits in the information piece inf12 are "111111". In this case, the print data Dt includes the information pieces inf11 to inf15 as the data part D1 but does not include the data part D2 (all of the additional information pieces inf21 to inf26 are omitted), so that the data length of the print data Dt is shortest.

Figures 8A, 8B, 8C, 8D:
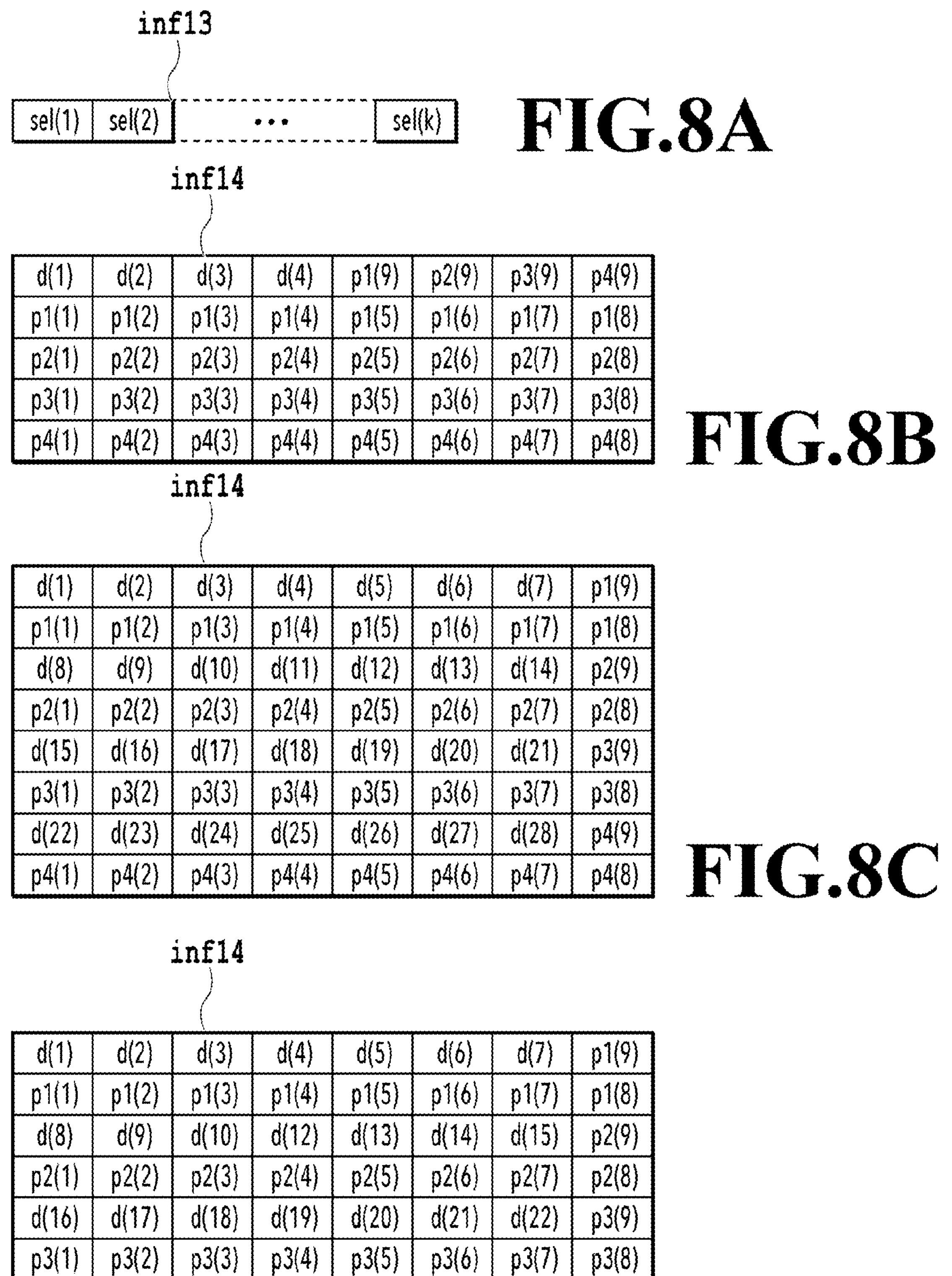
FIGS. 8A to 8D are diagrams illustrating bit arrays of information pieces inf.

FIG. 8A illustrates the bit array of the information piece inf13 in FIG. 5. The information piece inf13 includes bits sel(1) to sel(k) and is sent in the order of the bits sel(1), sel(2), . . . , sel(k). The bits in the information piece inf13 are held in the logic unit 2075 in FIG. 4. The data held in the logic unit 2075 will now be described using FIG. 4. The bits sel(1), sel(2), . . . , sel(k) held in the logic unit 2075 undergoes an AND operation with the signal HEAT output from the logic unit 2076. Thus, the signal HEAT is input into the driving elements 202 corresponding to the bits to which 1 is written among the bits sel(1), sel(2), . . . , sel(k). The signal HEAT is not input into the driving elements 202 corresponding to the bits to which 0 is written since the result of the AND operation is always 0. Only the printing elements 201 connected to the driving elements into which the signal HEAT is input turn to a conducting state, thereby heating the ink. At this time, bubbles are generated in the ink and eject the ink from corresponding nozzles not illustrated. As a result, a printing operation is performed. With the above operation, the bits sel(1), sel(2), . . . , sel(k) function as data that selects whether to perform a printing operation with the printing elements 2011, 2012, . . . , 202*k*.

FIG. 8B illustrates the bit array of the information piece inf14 in FIG. 5. The information piece inf14 is sent in the order of the bits d(1) to d(4), p1(9) to p4(9), p1(1) to p1(8), p2(1) to p2(8), p3(1) to p3(8), and p4(1) to p4(8). The bits in the information piece inf14 are held in the logic unit 2076 in FIG. 4. The bits d(1) to d(4) at the head are dummy bits that are provided in order to adjust the bit length in the horizontal direction in FIG. 8B to eight bits, and do not affect the operation in the present embodiment.

FIG. 8C is a diagram illustrating a conventional example of sending the bits p1(1) to p1(9) in the form of a single continuous piece of data as a mode of sending the information piece inf14, explaining a difference from the present embodiment. In FIG. 8C, each of the bits p2(1) to p2(9), p3(1) to p3(9), and p4(1) to p4(9) is likewise sent in the form of a single continuous piece of data.

In serial communication of the print data Dt, a circuit that converts serial data into parallel data (a serial-to-parallel conversion circuit, hereinafter referred to as "serial-parallel conversion circuit") is used. The serial-parallel conversion circuit is generally configured such that the minimum unit for the fixed bit width (the number of bits into which serial data can be converted into parallel data in a single conversion operation) is set to 8 bits (=1 byte). Thus, in FIG. 8C, the information piece inf14 including the dummy bits d(1) to d(28) is 8-byte data as a whole.

On the other hand, in the present embodiment, as illustrated in FIG. 8B, the single most significant bit in each of the pieces of data p1 to p4 (specifically, p1(9), p2(9), p3(9), and p4(9)) is gathered in 1 byte. In this way, the data of the information piece inf14 can be formed with 5 bytes.

Figure 9:
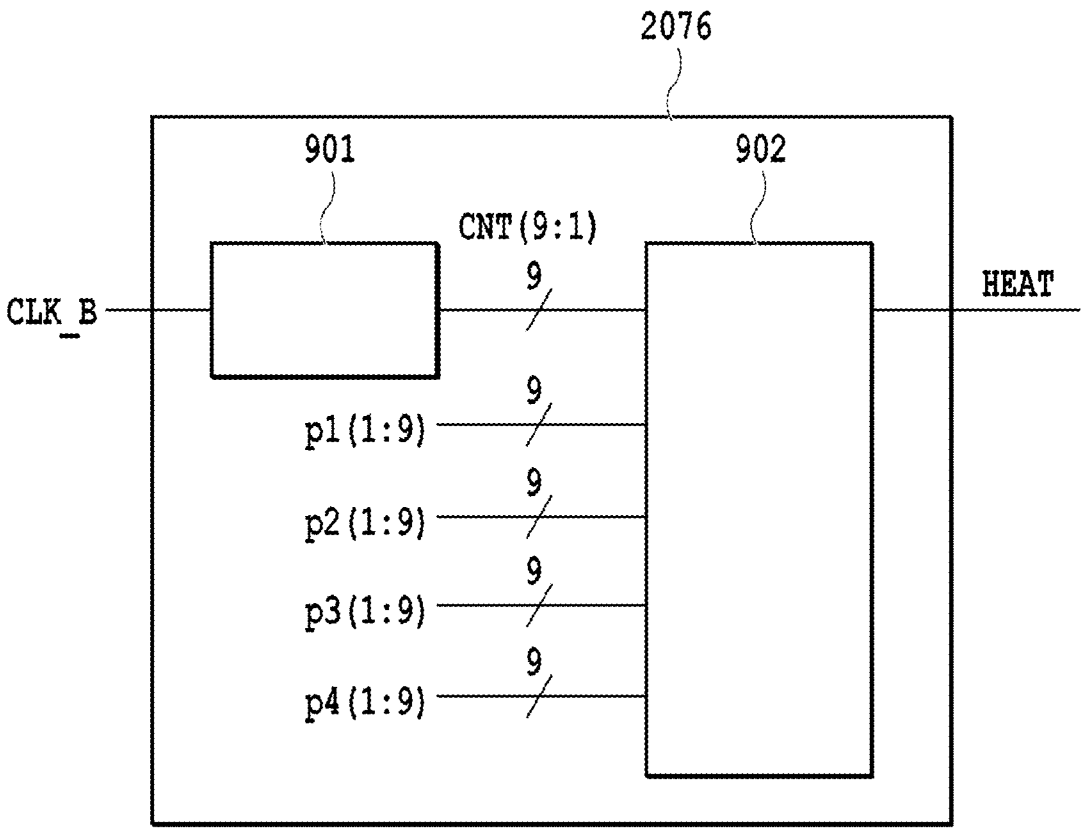
FIG. 9 is a block diagram illustrating a configuration of a logic unit.

FIG. 9 is a diagram of a configuration of the logic unit 2076 in FIG. 4. A clock CLK_B is input into a counter 901. The counter 901 counts the edges of the clock CLK_B and outputs a signal CNT(9:1), which is a 9-bit signal. This signal CNT is input into a comparator 902.

Synthesized data p1(9:1) is also input into the comparator 902. The synthesized data p1(9:1) represents 9-bit data in which the bits p1(9) to p1(1) in FIG. 8B are arranged in this order from higher to lower-order bits. Similarly, synthesized data p2(9:1), synthesized data p3(9:1), and synthesized data p4(9:1) are input into the comparator 902.

It is to be noted that the terms "bit(s)" and "data" are distinguished in the following depending on the description, but the bits p1(9) to p1(1) and the synthesized data p1(9:1) basically mean the same. This rule of representation will be applied similarly to p2 to p4 as well.

The comparator 902 compares the signal CNT and the pieces of synthesized data p1(9:1) to p4(9:1) to generate the signal HEAT. The signal HEAT generated by the comparator 902 is output from the logic unit 2076. Details will be described later using FIG. 10.

In the present embodiment, while the pieces of synthesized data p1(9:1) to p4(9:1) each function as multi-bit data with nine bits, this 9-bit data is arranged in a non-continuous layout by performing bit division on part of the 9-bit data as illustrated in FIG. 8B. Specifically, in this example, the bits p1(9) to p4(9) after the bit division are organized and continuously arranged to be included in the most significant packet (8-bit data), and dummy data is assigned as the remaining bits in this packet. Incidentally, separating a bit in multi-bit data (9-bit data in this example) or arranging individual pieces of multi-bit data in a non-continuous layout as indicated by the bit array of the information piece inf14 will be described herein as "extracting".

Figure 10:
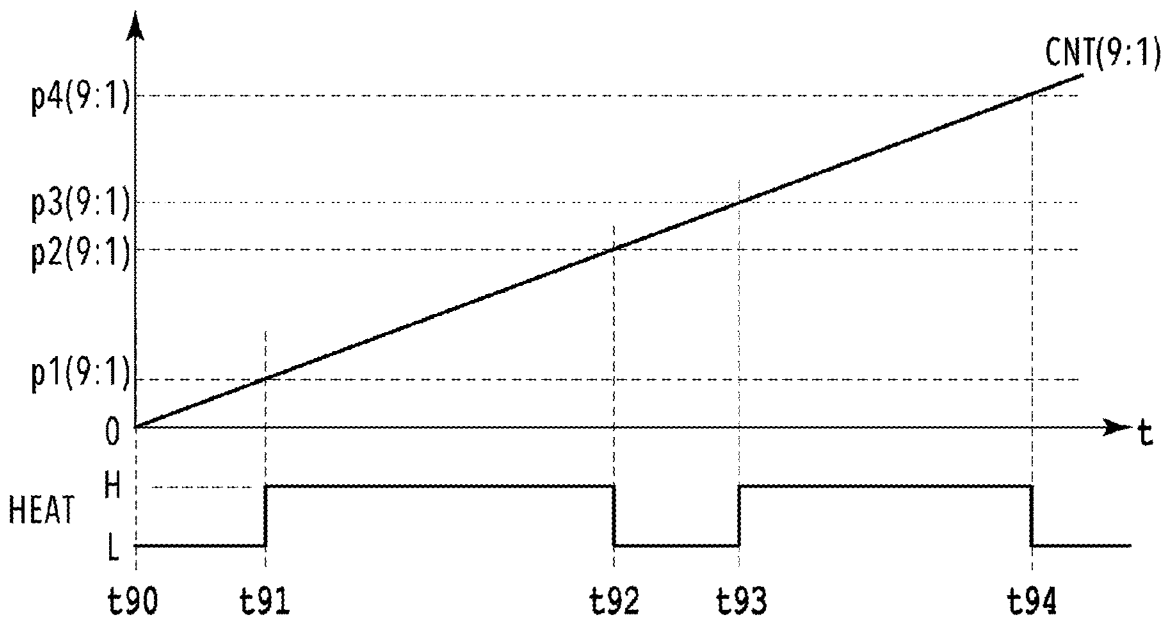
FIG. 10 is a diagram for explaining an operation of generating a signal HEAT.

FIG. 10 is a diagram for explaining the operation of generating the signal HEAT by the logic unit 2076 in FIG. 4. In FIG. 10, the vertical axis represents the count value of the signal CNT. The signal CNT is a signal obtained by counting the edges of the clock CLK_B not illustrated. In this example, the counting of the signal CNT starts at a time t90. The signal level of the signal HEAT at this time is L.

At a time t91, the signal CNT matches the data p1, and the signal level of the signal HEAT shifts to H. Subsequently, the signal CNT matches the data p2 at a time t92, the data p3 at a time t93, and the data p4 at a time t94, and the level of the signal HEAT shifts to L, H, and L in this order.

Figure 11A:
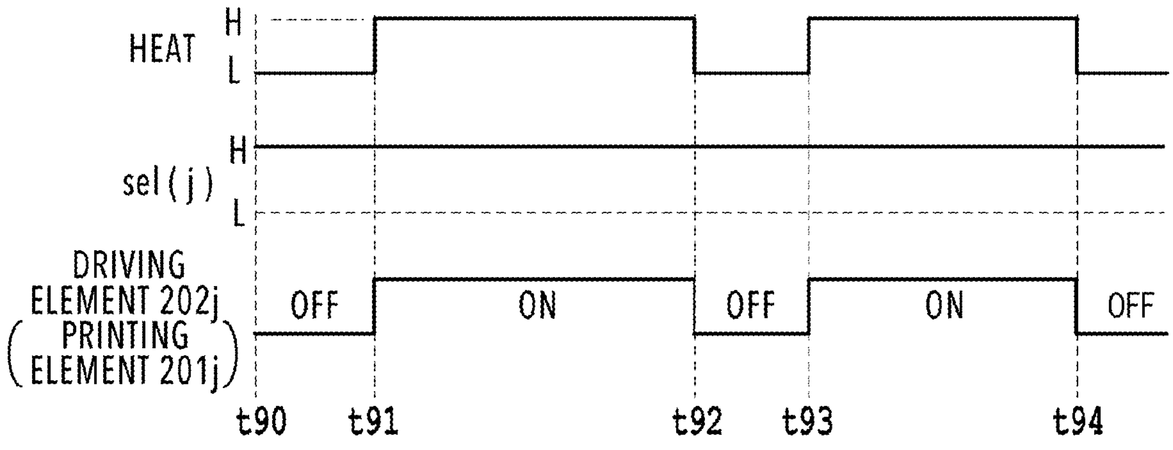

FIG. 11A is a diagram explaining a state of operation of a printing element 201, a driving element 202, and a logic element 203. A logic element 203*j* (j=1, 2, . . . , k) receives a bit sel(j) from the logic unit 2075 and the signal HEAT from the logic unit 2076. The logic element 203*j* includes a two-input AND element, and brings a driving element 202*j* into a conducting state (illustrated as "ON" in FIG. 11A) in intervals in which the bit sel(j) and the signal HEAT are both at their respective levels H. The logic element 203*j* brings the driving element 202*j* to a non-conducting state in intervals in which the signal HEAT is at the level L (illustrated as "OFF" in FIG. 11A). In the case where the driving element 202*j* turns to the conducting state, a current flows into a printing element 201*j*. As a result, the ink is heated, and an ink droplet is ejected.

Figure 11B:
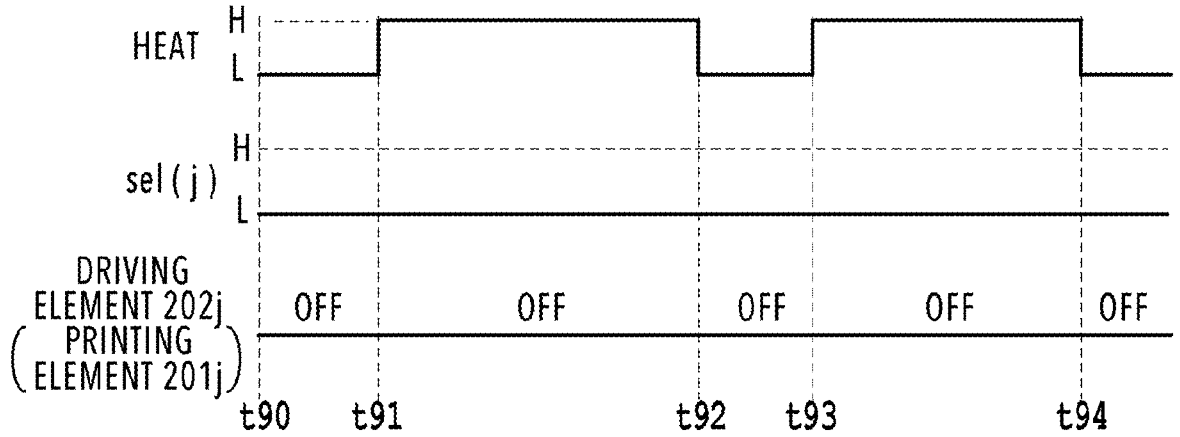

FIG. 11B is a diagram explaining a state different from FIG. 11A. In this state, the level of the bit sel(j) always remains at L. Thus, the driving element 202*j* is in the non-conducting state regardless of the level of the signal HEAT, so that no ink droplet is ejected.

In the operations illustrated in FIGS. 11A and 11B, the bit sel(j) functions as a signal for selecting whether or not to drive the printing element 201*j* and the signal HEAT functions as a signal that determines the timing to drive the printing element 201*j*.

Figure 12:
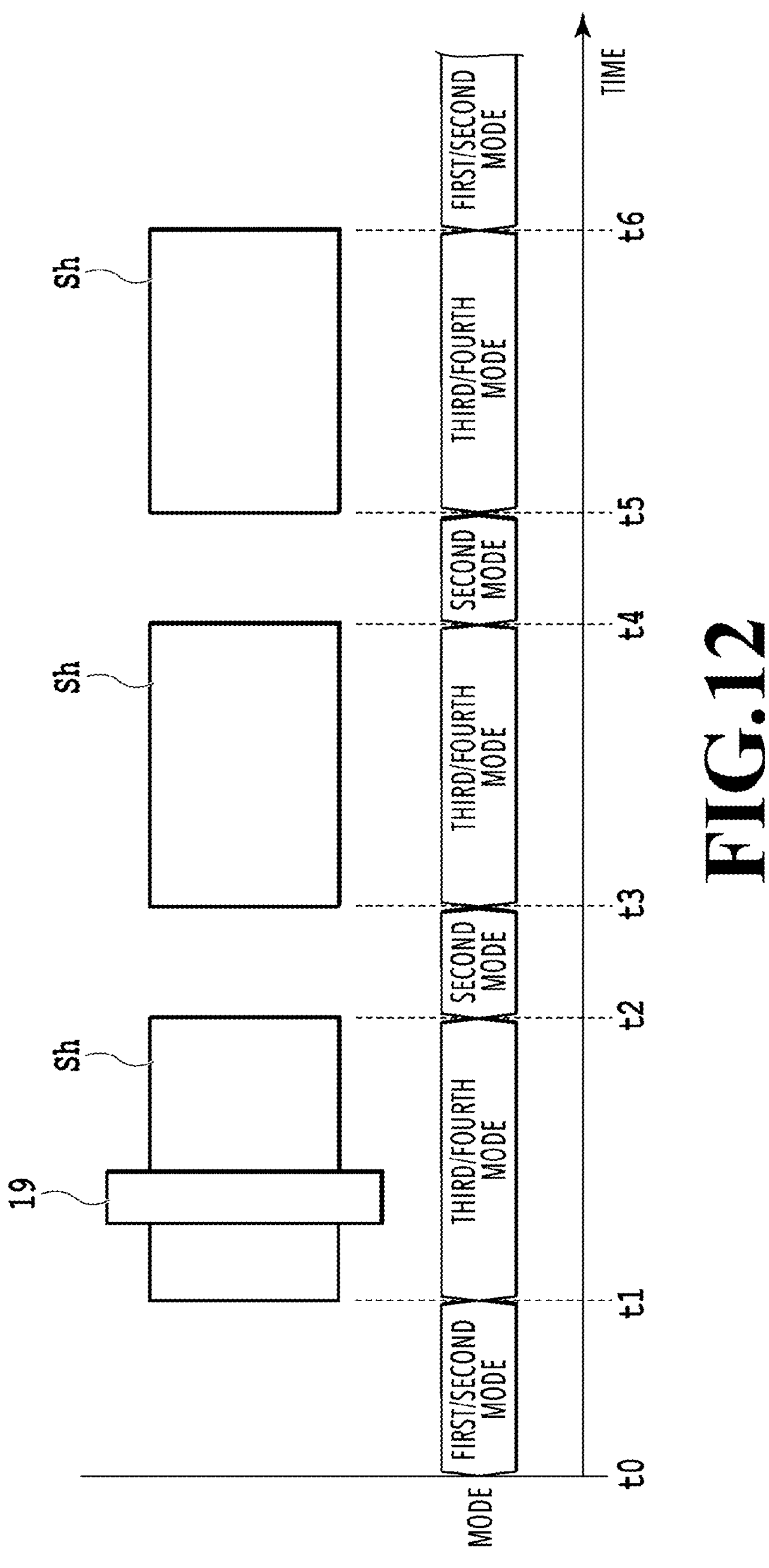
FIG. 12 is a diagram illustrating mode shift in a case of performing printing on three sheets.

FIG. 12 illustrates a mode of sending the print data Dt to be sent in units of packets in a case of performing printing on three sheets Sh. As mentioned earlier, a line heat is used as the print head 19 in the present embodiment. Thus, the print head 19 is capable of performing printing on the entirety of each sheet Sh in the sheet width direction at once while moving relative to the sheet Sh in the sheet length direction. In the printing apparatus 1, the sheets Sh are actually moved relative to the print head 19 to perform printing on the moved sheets Sh, but the print head 19 is illustrated in FIG. 12 as being moved relative to the three sheets Sh to facilitate understanding.

The horizontal axis in FIG. 12 is a temporal axis. For example, the printing apparatus 1 is activated or initialized at a time t0. Then, in response to input of a print job, printing of the first sheet Sh is started at a time t1, and the printing of the first sheet Sh is completed at a time t2. Printing of the second sheet Sh is started at a time t3, and the printing of the second sheet Sh is completed at a time t4. Similarly, printing of the third sheet Sh is started at a time t5, and the printing of the third sheet Sh is completed at a time t6. The printing process for the input print job is completed at the time t6.

In the period from the time t0 to the time t1, the print data Dt is sent in the first mode (see FIG. 7A) or the second mode (see FIG. 7B) in units of packets. As a result, functions such as temperature adjustment for start-up for printing and detection by the ejection sensors are set up.

In the period from the time t1 to the time t2, the print data Dt is sent in the third mode (see FIG. 7C) or the fourth mode (see FIG. 7D) in units of packets. In the third mode, the data to be sent is reduced to limit the functions to the printing operation, the temperature adjustment, and the detection by the ejection sensors. This shortens the data cycle (ejection cycle). In the fourth mode, the data to be sent is reduced to limit the functions to the printing operation. This makes the amount of data to be sent smallest and makes the data cycle (ejection cycle) shortest.

In the period from the time t2 to the time t3, which is the period from the completion of the printing of the first sheet Sh to the start of the printing of the second sheet Sh, the print data Dt is sent in the second mode (see FIG. 7B) in units of packets.

In the period from the time t3 to the time t4 and the period from the time t5 to the time t6, the print data Dt is sent in the third mode or the fourth mode, as in the period from the time t1 to the time t2. In the period from the time t4 to the time t5, the print data Dt is sent in the second mode, as in the period from the time t2 to the time t3. After the time t6, the print data Dt is sent in the first mode or the second mode, so that initialization of all functions, a stand-by operation for printing, and the like are performed.

As described above, the period in which the printing apparatus 1 is activated is divided into a period in which the print head 19 actually executes printing (printing period (first period)) and a period in which the printing is not executed and stopped (printing stop period (second period). In the present embodiment, in which the print head 19 is a line head, the printing period is a period in which a sheet Sh passes under the print head 19. The printing stop period is a period other than the printing period in which the printing apparatus 1 is activated, e.g., the period from the completion of printing of one sheet Sh to the start of printing of the next sheet Sh, or the like.

As described using FIG. 12, in the printing period, the print data Dt is formed in a smaller size than in the printing stop period. In the printing stop period, the print data Dt is formed in a larger size than in the printing period. Thus, in the printing period, the amount of the print data Dt to be sent in units of packets is smaller. This makes it possible to omit unnecessary communication or communication with low priority between the control circuit board 13 and each individual element substrate 15 or lower the communication speed or the sending speed between them.

Incidentally, it suffices that the print data Dt is different in data size between the printing period and the printing stop period. As long as this condition is met, any of the above-described first to fourth modes (see FIGS. 7A to 7D) may be assigned to the printing period and the printing stop period.

Referring back to FIGS. 1B and 4 again, in the present embodiment, the processor 131, which functions as a sending unit in the communication of the print data Dt, includes the first generation unit 1311, the second generation unit 1312, and the third generation unit 1313. Also, the processor 209, which functions as a reception unit, includes the first processing unit 2091, the second processing unit 2092, and the third processing unit 2093.

First, the processor 131, which functions as a sending unit, will be described. The first generation unit 1311 generates the data part D1 forming part of the print data Dt. This data part D1 includes the multiple information pieces inf11 to inf15, and their data length (data size) is fixed. The first generation unit 1311 also adds dummy bits d(1) to d(4) to the pieces of synthesized data p1(9:1) to p4(9:1) included in the print data Dt to generate the information piece inf14 (5 bytes) with the bit array illustrated in FIG. 8B.

The second generation unit 1312 generates the data part D2 forming the other part of the print data Dt. This data part D2 is configured to be capable of containing the multiple additional information pieces inf21 to inf26, and their data length is variable.

The third generation unit 1313 generates the print data Dt by combining the data part D1 and the data part D2 in a predetermined order. In the present embodiment, as illustrated in FIG. 5, the print data Dt is generated in a layout in which the additional information pieces inf21 to inf26 are arranged between the information pieces inf11 to inf14 and the information piece inf15. The print data Dt thus generated is sent to the processor 209.

Next, the processor 209, which functions as a reception unit, will be described. The first processing unit 2091 identifies the information piece inf12 in the data part D1, which is an additional information identifier, from the print data Dt received from the processor 131. The second processing unit 2092 identifies the data part D2 from the received print data Dt based on the content of the information piece inf12, and identifies the data part D1 as well.

Here, as illustrated in FIG. 5, the information piece inf12, which is an additional information identifier, is arranged before the additional information pieces inf21 to inf26 and indicates the presence or absence of each of the additional information pieces inf21, inf22, inf23, inf24, inf25, and inf26 in the data part D2. This structure enables the first processing unit 2091 to properly identify the information piece inf12, which is an additional information identifier. The second processing unit 2092 is capable of properly identifying the data part D2 based on the content of the information piece inf12, which is an additional information identifier, and also identifying the data part D1.

In addition, the second processing unit 2092 identifies the bits p1(9) to p1(1) illustrated in FIG. 8B from the identified data part D1 and arranges the p1(9) to p1(1) in this order from higher to lower-order bits to generate the synthesized data p1(9:1). The second processing unit 2092 similarly generates the synthesized data p2(9:1), the synthesized data p3(9:1), and the synthesized data p4(9:1).

The third processing unit 2093 performs driving control for the printing operation itself among the driving control processes for the element substrate 15 based on the identified data part D1. The third processing unit 2093 also performs driving control related to the printing operation among the driving control processes for the element substrate 15 based on the identified data part D2.

A case where the print data Dt is sent in the first mode (see FIG. 7A) will be described as an example of the above "related driving control".

In a specific example of the "related driving control", the heating elements 206 heat the element substrate 15 based on the result of the detection by the temperature sensor 205 (the additional information pieces inf21 and inf25 are "0 (present)"). Moreover, the residue removal units 204 remove ink residues based on the results of the detection by the ejection sensors 210 (the additional information pieces inf24 and inf26 are "0 (present)"). Furthermore, analog signals and digital signals are output to the control circuit board 13 (the additional information pieces inf22 and inf23 are "0 (present)").

In the present embodiment, the print data Dt is generated based on a print job input into the printing apparatus 1 from an external apparatus, and this print data Dt is sent to each element substrate 15 in the print head 19 by a serial transfer method. The print data Dt is generated by combining the data part D1 with a fixed data length and the data part D2 with a variable data length in a predetermined order.

One of the multiple information pieces inf11 and so on included in the data part D1 is the information piece inf12, which is an additional information identifier. This information piece inf12 indicates the presence or absence of each of the multiple additional information pieces inf21 and so on that can be included in the data part D2, and the data length of the data part D2 is variable. The maximum value of the number of multiple additional information pieces inf21 and so on that can be included in the data part D2 is K (K is an integer of 1 or more). In this case, in one example, the information piece inf12, which is an additional information identifier, may be K-bit data (K=8 in the present embodiment).

The presence or absence of each of the multiple additional information pieces inf21 and so on (or the information piece inf12 indicating it) may be changed as the printing environment changes. This will now be described specifically. For example, a period after the printing apparatus 1 starts printing while conveying a sheet until the completion of the conveyance and the printing includes a printing period in which the print head 19 actually executes the printing and a printing stop period in which the printing is stopped. In the printing period, the amount of the print data Dt to be sent in units of packets is smaller than in the printing stop period. Thus, the information piece inf12, which is an additional information identifier, is changed when the data part D1 is generated between the printing period and the printing stop period, and whether to generate each of the multiple additional information pieces inf21 and so on is changed when the data part D2 is generated between the two periods.

Incidentally, a case where the information piece inf14 is subjected to division of 9-bit data and bit rearrangement has been exemplarily described above. Here, from the viewpoint of dividing bits, the contents described above can be applied to all information pieces forming the print data Dt. Also, an example in which the single most significant bit in each of the pieces of data p1 to p4 is gathered has been presented, but the bit organizing method is not limited to this one. For example, the single least significant bit or the single middle bit can be gathered, or multiple bits can be gathered instead of a single bit. It is to be noted that the contents described in this paragraph apply similarly to the second and subsequent embodiments below.

Second Embodiment

In the first embodiment, an example has been presented in which the single most significant bit in each of the pieces of data p1 to p4 is extracted, specifically, the single most significant bit in each of the pieces of data p1 to p4 is gathered in the 1-byte head data in the information piece inf14 and sent. Unlike this, in a second embodiment, the extracted pieces of data are allocated to an additional information piece. Note that the following will mainly describe the contents different from the above, and description of the same contents as the above may be omitted.

Figure 13:
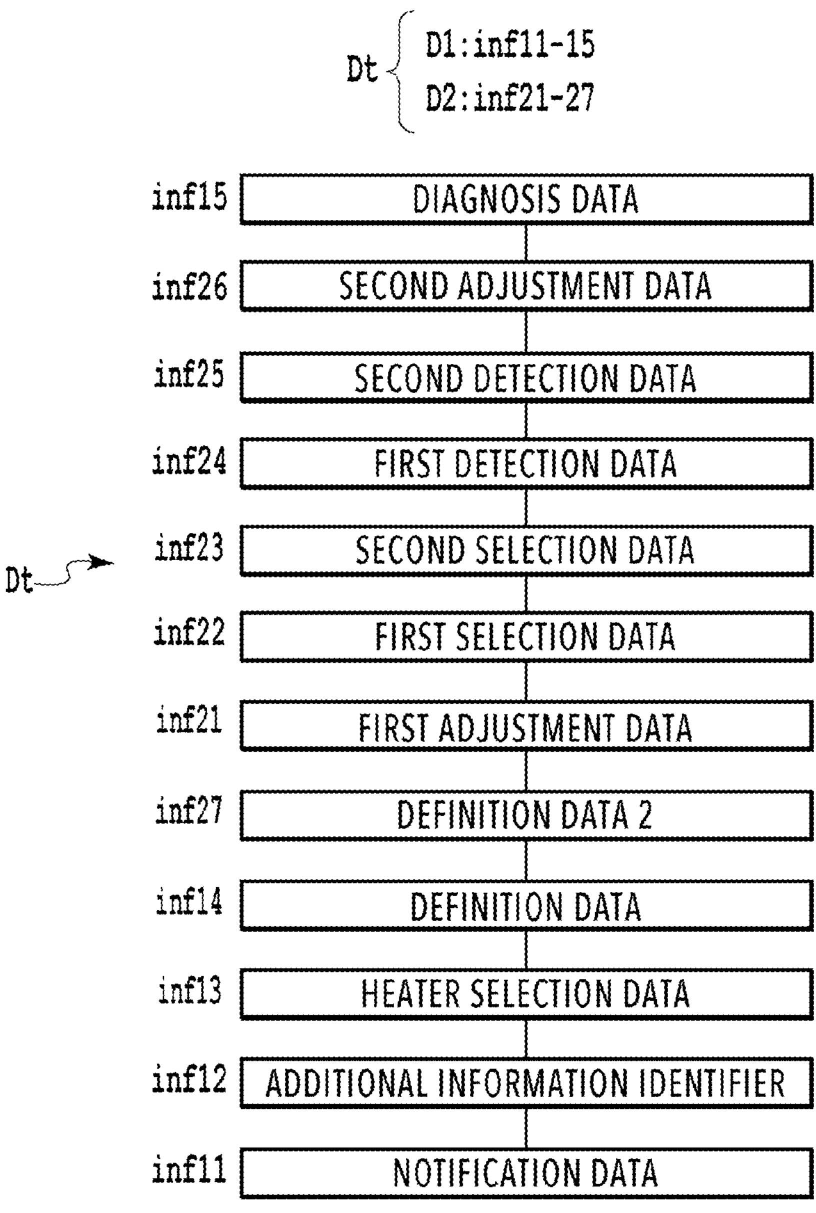
FIG. 13 is a diagram illustrating a data structure of the print data Dt to be sent in a single operation.

FIG. 13 illustrates an example data structure of the print data Dt being data (serial data) to be sent in a single operation. The data part D2 is configured to be capable of containing an additional information piece inf27 in addition to the multiple additional information pieces inf21 to inf26. The data length of the data part D2 is variable.

FIG. 14 illustrates the content of the information piece inf12, which is an additional information identifier. In the present embodiment, the information piece inf12 is 8-bit data. The seventh bit indicates the presence or absence of the additional information piece inf27. The eighth bit is dummy data (NULL) for maintaining the data size of the information piece inf 12 at eight bits. The data part D2 includes the additional information piece inf27 in a case where the seventh bit is "0", and does not include the additional information piece inf27 in a case where the seventh bit is "1".

Incidentally, the additional information piece inf27 is described as "DEFINITION DATA 2" in FIG. 13 since it forms definition data for defining the pulse waveforms of the driving signals for the printing elements 201.

FIG. 15A illustrates the bit arrays of the information piece inf14 and the additional information piece inf27 in the case where the seventh bit in the information piece inf12 (see FIG. 13), which is an additional information identifier, is "0". As in the first embodiment, the bit configuration of the synthesized data p1(1:9) represents 9-bit data in which its bits are arranged from higher to lower-order bits starting from the most significant bit p1(9) in the order of p1(9), p1(8), p1(7), . . . . In other words, the bits are arranged starting from the least significant bit in the order of p1(1), p1(2), . . . , p1(9).

The bit array of the information piece inf14 in FIG. 15A is partly the same as that in the first embodiment (see FIG. 8B). In the present embodiment, however, unlike the first embodiment, the bits d(1) to d(4), p1(9), p2(9), p3(9), and p4(9) are included in the additional information piece inf27. Also, the bits p1(1) to p1(8), p2(1) to p1(8), p3(1) to p3(8), and p4(1) to p4(8) are included in the information piece inf14.

The bit or bits to be included in the additional information piece inf27 among the nine bits forming the synthesized data p1(9:1) and the number of such bits (one (i.e., one bit) in the example of FIG. 15A) are determined in advance. To generally describe this, a high-order bit array in the synthesized data having a predetermined bit length in the direction from its most significant bit toward the lower-order bits is included in the additional information piece. Specifically, in this example, a high-order bit array p1(9) in the synthesized data p1(9:1) having a length of one bit in the direction from its most significant bit p1(9) toward the lower-order bits is included in the additional information piece inf27. Regarding the number of bits to be included in the additional information piece inf27, the same applies to the other pieces of synthesized data, or the pieces of synthesized data p2(9:1) to p4(9:1).

Note that while one bit is employed as the predetermined bit length in the above, any single value that is two bits or more may be employed. For example, in a case of employing two bits, the bits p1(9) and p1(8) are included in the additional information piece inf27 in FIG. 15A.

Regarding the method of determining the length of the high-order bit array included in the additional information piece mentioned above (i.e., the predetermined bit length), this length is dependent on the maximum value available for each piece of synthesized data (e.g., the synthesized data p1(9:1) and so on). That is, as in FIG. 16 to be mentioned later, in a case where the length of the synthesized data p4 is eight bits at most (the maximum value of p4 is 255 or less), each of the bits p1(9), p2(9), p3(9), and p4(9) is always 0. Thus, the bit array with a length of one bit from the most significant bit is included in the additional information piece inf27, and the seventh bit in FIG. 14 (the presence or absence of the additional information piece inf27) is set to 1 to omit the additional information piece inf27. Such a configuration makes it possible to shorten the length of the print data Dt in FIG. 13, and reduce the data amount of each piece of synthesized data to be actually sent as illustrated in FIG. 15B.

Also, a configuration is conceivable in which, unlike the above, a low-order bit array in each piece of synthesized data having with a predetermined bit length in the direction from its least significant bit toward the higher-order bits is included in an additional information piece. Moreover, the configuration in which a high-order bit array having a predetermined bit length in the direction from the most significant bit toward the lower-order bits is included in an additional information piece and the configuration in which a low-order bit array having a predetermined bit length in the direction from the least significant bit toward the higher-order bits is included in an additional information piece may be combined.

Regarding the method of determining the length of the low-order bit array included in the additional information piece mentioned above (i.e., the predetermined bit length), this length is dependent on the resolution of each piece of synthesized data (e.g., the synthesized data p1(9:1) and so on). The resolution refers to the minimum unit amount by which the value of the synthesized data changes (such as intervals of 1 or 2). The resolution can also be called the minimum amount of change.

Figure 18:
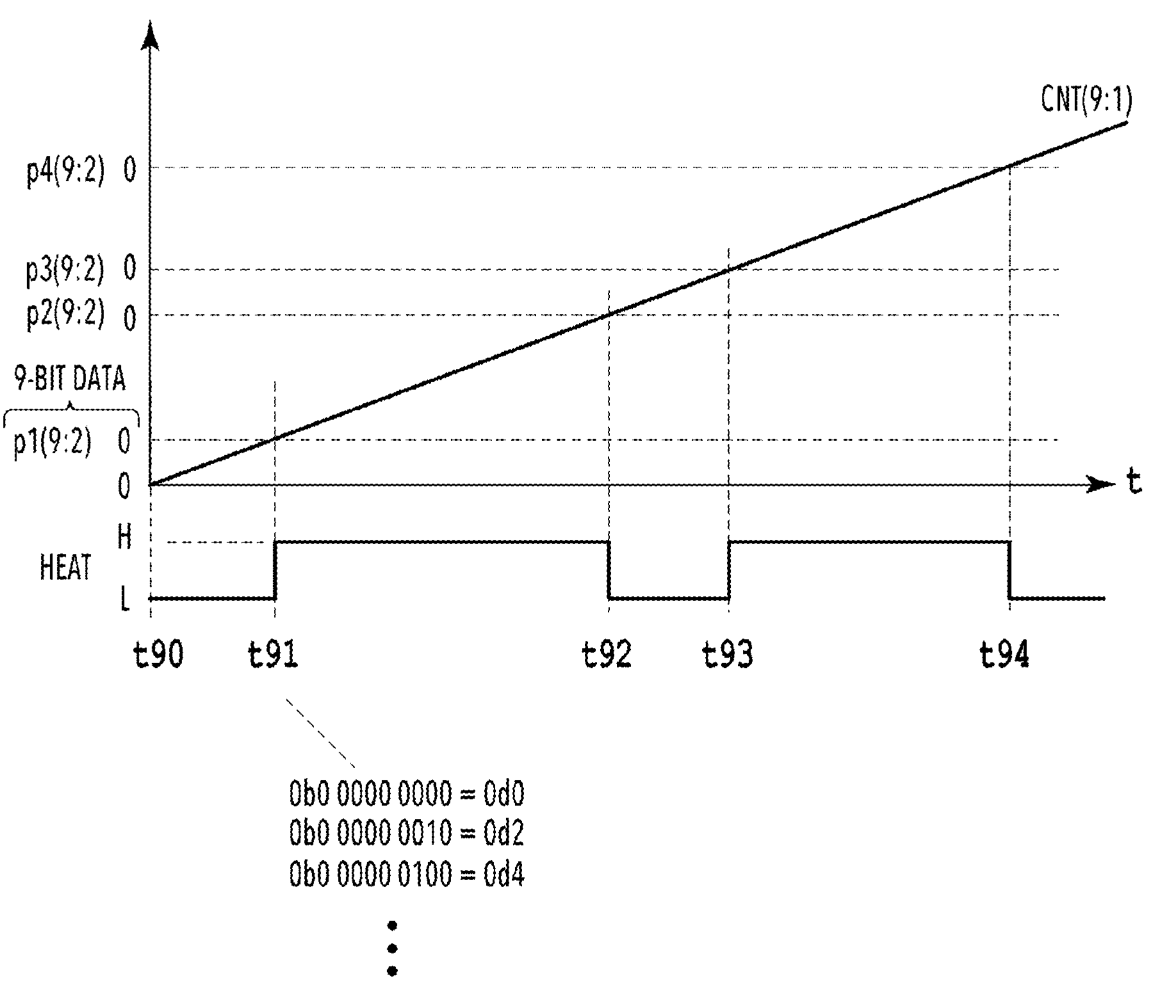
FIG. 18 is a diagram for explaining an operation of generating the signal HEAT.

Specifically, as illustrated in FIG. 18 to be mentioned later, in a case where the resolution of the pieces of synthesized data p1 to p4 is 2, the least significant bits in the pieces of synthesized data p1 to p4, specifically, the bits p1(1), p2(1), p3(1), and p4(1) are always 0. Thus, the bit arrays with a length of one bit from the least significant bits are included in the additional information piece inf27, and the seventh bit in FIG. 14 (the presence or absence of the additional information piece inf27) is set to 1 to omit the additional information piece inf27. Such a configuration makes it possible to shorten the length of the print data Dt in FIG. 13, and reduce the data amount of each piece of synthesized data to be actually sent as illustrated in FIG. 17B.

In the case where the seventh bit in the information piece inf12, which is an additional information identifier, is "0", the bits p1(9) to p1(1) in the data p1 are arranged in this order from higher to lower-order bits to form 9-bit synthesized data p1(9:1). The pieces of data p2 to p4 are configured similarly to the data p1.

FIG. 15B illustrates the bit array of the information piece inf14 in the case where the seventh bit in the information piece inf12, which is an additional information identifier, is "1". As illustrated in FIG. 15B, the additional information piece inf27 is omitted in the case where the seventh bit in the information piece inf12, which is an additional information identifier, is "1".

In this case, the most significant bit in the data p1 is set to "0", and the subsequent bits p1(8) to p1(1) are arranged in this order from higher to lower-order bits to form 9-bit data p1(9:1). The pieces of data p2 to p4 are configured similarly to the data p1.

Figure 16:
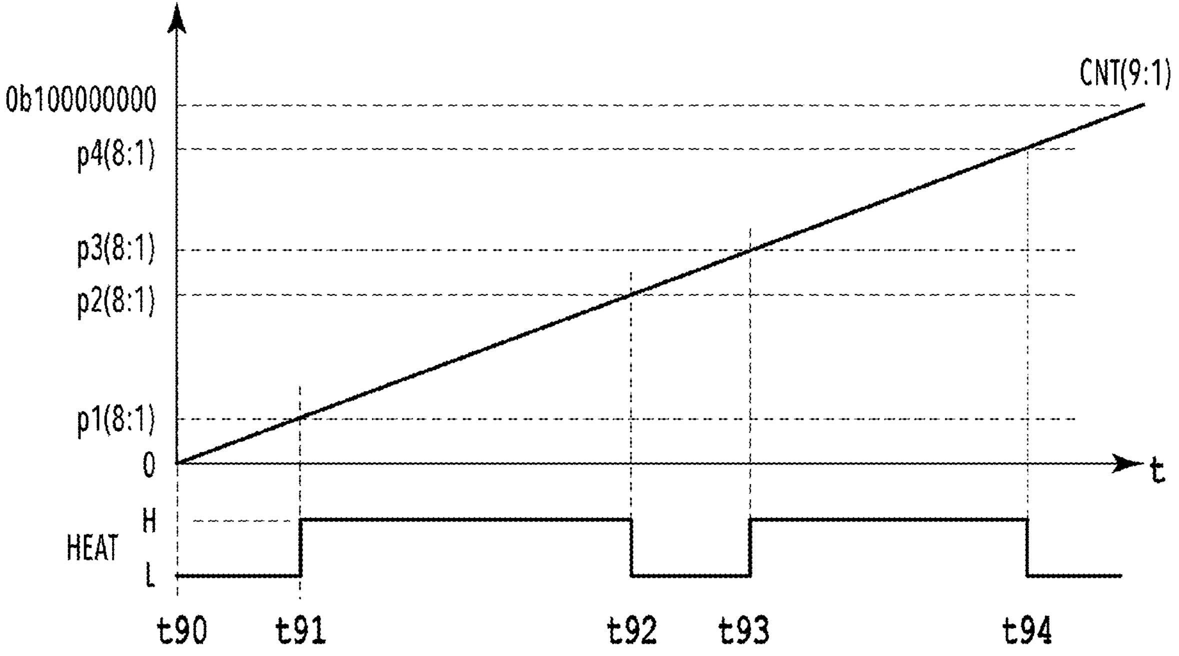
FIG. 16 is a diagram for explaining an operation of generating the signal HEAT.

FIG. 16 is a diagram similar to FIG. 10 in the first embodiment, and is a diagram for explaining the operation of generating the signal HEAT by the logic unit 2076 in FIG. 4 in the present embodiment. The vertical axis represents the count value of the counter 901 in FIG. 9, and the horizontal axis represents time.

FIG. 16 indicates that the pieces of data p1 to p4 are all smaller than "0b1 0000 0000". Here, the pieces of data p1 to p4 can each be expressed with eight bits. Thus, the data part in which their ninth bits are gathered can be deleted from the data array. That is, FIG. 16 illustrates a case where the seventh bit in the information piece inf12, which is an additional information identifier, can be set to "1".

In a case where the ninth bit in the largest data p4 among the pieces of data p1 to p4 is "0", the seventh bit in the information piece inf12, which is an additional information identifier, is set to "1", so that the ninth bits in the pieces of data p1 to p4 can be set to "0" without being included in the print data Dt.

The processor 131, which functions as a sending unit, can determine whether to set the seventh bit in the information piece inf12 to "0" or to "1" since the bit p4(9), which is the ninth bit in the data p4, is included in the print data Dt.

As in the first embodiment, the processor 209, which functions as a reception unit, identifies the data parts D2 and D1 from the print data Dt received from the processor 131. Also, as in the first embodiment, the first processing unit 2091 is capable of properly identifying the information piece inf12, which is an additional information identifier.

The second processing unit 2092 refers to the seventh bit in the information piece inf12, which is an additional information identifier, and executes an operation of generating the pieces of synthesized data p1(9:1), p2(9:1), p3(9:1), and p4(9:1) as described above according to the referred seventh bit.

The present embodiment is characterized in that the length of print data can be adjusted according to the pulse length of the signal HEAT. In a case where the duration of the signal HEAT is short, the cycle of the printing operation is shorter than in a case where the duration is long. Thus, the frequency of sending the print data Dt (referred to also as "transmission frequency") is often desired to be higher. The configuration of the present embodiment is effective in such a case.

In the above, the single most significant bit in each of the pieces of data p1 to p4 (specifically, the bits p1(9), p2(9), p3(9), and p4(9)) is allocated to the additional information piece inf27. Note, however, that the present embodiment is not limited to this case. A similar advantageous effect can be achieved by applying the present embodiment to the two or more highest-order bits in each of the pieces of data p1 to p4. Moreover, from the viewpoint of omitting sending of unnecessary data bits according to the data's set range (maximum value), it is possible to apply the present embodiment to all information pieces forming the print data Dt.

Third Embodiment

In the second embodiment, an example in which the single most significant bits in the pieces of data p1 to p4 are extracted, gathered, and sent in 1-byte data (additional information piece inf27) has been described. Unlike this, in a third embodiment, lower-order bits in the pieces of data p1 to p4 are extracted and allocated to an additional information piece. Note that the following will mainly describe the contents different from the foregoing embodiments, and description of the same contents as the above may be omitted.

The print data Dt being data (serial data) to be sent in a single operation is similar to that in the second embodiment (see FIG. 13). As in the second embodiment, the data part D2 includes the additional information piece inf27 in a case where the seventh bit in the information piece inf12 is "0", and does not include the additional information piece inf27 in a case where the seventh bit is "1".

FIG. 17A illustrates the bit arrays of the information piece inf14 and the additional information piece inf27 in the case where the seventh bit in the information piece inf12 (see FIG. 13), which is an additional information identifier, is "0". The bits d(1) to d(4), p1(1), p2(1), p3(1), and p4(1) are included in the additional information piece inf27. Moreover, the bits p1(2) to p1(9), p2(2) to p1(9), p3(2) to p3(9), and p4(2) to p4(9) are included in the information piece inf14.

In the case where the seventh bit in the information piece inf12, which is an additional information identifier, is "0", the bits p1(9) to p1(1) in the data p1 are arranged in this order from higher to lower-order bits to form 9-bit synthesized data p1(9:1). The pieces of data p2 to p4 are configured similarly to the data p1.

FIG. 17B illustrates the bit array of the information piece inf14 in the case where the seventh bit in the information piece inf12, which is an additional information identifier, is "1". As illustrated in FIG. 17B, the additional information piece inf27 is omitted in the case where the seventh bit in the information piece inf12, which is an additional information identifier, is "1".

In this case, the bits p1(8) to p1(1) in the data p1 are arranged in this order from higher to lower-order bits with the least significant bit set to "0" to form 9-bit synthesized data p1(9:1). The pieces of data p2 to p4 are configured similarly to the data p1.

FIG. 18 is a diagram similar to FIG. 10 in the first embodiment, and is a diagram for explaining the operation of generating the signal HEAT by the logic unit 2076 in FIG. 4 in the present embodiment. The vertical axis represents the count value of the counter 901 in FIG. 9, and the horizontal axis represents time.

FIG. 18 is a diagram illustrating the generation of the signal HEAT in the case where the seventh bit in the information piece inf12, which is an additional information identifier, is set to "1". As mentioned earlier, the least significant bits in the pieces of data p1 to p4 are fixed to 0. In FIG. 18, a 9-bit array with the least significant bit fixed to 0 is described as, for example, "P1(9:2) 0".

To describe the values at a time t91 in FIG. 18, while FIG. 17B illustrates the print data Dt to be sent from which the additional information piece inf27 has been omitted, as described earlier, these values indicate a situation where a fixed value of 0 is allocated to the least significant bit at this time. That is, each of these values is compared with the count value of the counter 901, which represents the vertical axis, and the signal HEAT is toggled when the values match each other. Here, since the least significant bit is always 0, the resolution is half of the counter's resolution.

As in the first and second embodiments, the signal level of the signal HEAT changes at the times at which the signal CNT matches the pieces of data p1 to p4. However, since the least significant bits in the pieces of data p1 to p4 are fixed to 0, the settable time resolution at which to change the signal level is two counts of the signal CNT.

As means for setting the seventh bit in the information piece inf12 to "0" or to "1", a table in which lengths of the signal HEAT (set values of the data p4) and set values of the seventh bit are associated with each other may be provided to the processor 131, which functions as a sending unit. The processor 131 refers to this table and determines whether to set the seventh bit in the information piece inf12 to "0" or to "1". As an alternative approach, the element substrate 15 in FIG. 4 may be configured such that such a setting can be configured for the processor 131 through an input device not illustrated.

As in the first and second embodiments, the processor 209, which functions as a reception unit, identifies the data parts D2 and D1 from the print data Dt received from the processor 131.

Also, as in the first and second embodiments, the first processing unit 2091 is capable of properly identifying the information piece inf12, which is an additional information identifier.

The second processing unit 2092 refers to the seventh bit in the information piece inf12, which is an additional information identifier, and executes an operation of generating the pieces of synthesized data p1(9:1), p2(9:1), p3(9:1), and p4(9:1) as described above according to the referred seventh bit.

The present embodiment is characterized in that the resolution of the pulse time length of the signal HEAT can be adjusted. As the pulse length of the signal HEAT becomes longer, the amount of electric power to be input into the printing elements 2011 to 201*k* will be larger. However, the resolution of adjustment of the amount of electric power may be low as the amount of electric power increases. In such a case, applying the present embodiment can reduce the total amount of the print data Dt.

In the above, the single least significant bit in each of the pieces of data p1 to p4 (specifically, the bits p1(1), p2(1), p3(1), and p4(1)) is allocated to the additional information piece inf27. Note, however, that the present embodiment is not limited to this case. A similar advantageous effect can be achieved by applying the present embodiment to the two or more least significant bits in each of the pieces of data p1 to p4. Moreover, from the viewpoint of avoiding sending of unnecessary data bits according to the data's set resolution, it is possible to apply the present embodiment to all information pieces forming the print data Dt.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In accordance with the present disclosure, print data can be efficiently sent in a printing apparatus having a variety of functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-099177, filed Jun. 16, 2023, which is hereby incorporated by reference wherein in its entirety.

What is claimed is:

1. A method of sending print data in a printing apparatus by a serial transfer method, comprising: generating a first data part with a fixed data length;

generating a second data part with a variable data length; and combining the first data part and the second data part in a predetermined order to form resulting print data and sending the resulting print data, wherein the first data part includes a plurality of information pieces, the second data part is capable of including a plurality of additional information pieces, a first information piece being one of the plurality of information pieces included in the first data part indicates presence or absence of each of the plurality of additional information pieces in the second data part, a second information piece being one of the plurality of information pieces includes a plurality of pieces of synthesized data, and in the sending, the plurality of pieces of synthesized data are each subjected to bit division, and portions of the pieces of synthesized data subjected to the bit division which have a smaller bit length are continuously arranged in a single packet.

2. The method according to claim 1, wherein the portions of the pieces of synthesized data subjected to the bit division which have the smaller bit length are continuously arranged in a single packet in the second information piece.

3. The method according to claim 1, wherein the portions of the pieces of synthesized data subjected to the bit division which have the smaller bit length are allocated to a first additional information piece being one of the plurality of additional information pieces.

4. The method according to claim 3, wherein in the additional information piece to which the portions of the pieces of synthesized data are allocated, a high-order bit array in each of the pieces of synthesized data having a predetermined bit length in a direction from a most significant bit thereof toward lower-order bits thereof is arranged, or a low-order bit array in each of the pieces of synthesized data having a predetermined bit length in a direction from a least significant bit thereof toward higher-order bits thereof is arranged.

5. The method according to claim 4, wherein the predetermined bit length of the high-order bit array is determined according to a maximum value available for the piece of synthesized data.

6. The method according to claim 4, wherein the predetermined bit length of the low-order bit array is determined according to resolution of the piece of synthesized data.

7. The method according to claim 4, wherein the printing apparatus includes a circuit block, and the pieces of synthesized data are data that sets operation timing of the circuit block.

8. The method according to claim 7, wherein the circuit block includes a circuit that switches a current to flow into a printing element made in an element substrate.

9. The method according to claim 1, wherein the single packet includes dummy data and the portions of the pieces of synthesized data subjected to the bit division which have the smaller bit length.

10. The method according to claim 9, wherein the plurality of pieces of synthesized data have a same data length.

11. The method according to claim 10, wherein the data lengths of the plurality of pieces of synthesized data are larger than a data length of the single packet.

* * * * *